US007994938B2

(12) United States Patent
Lai

(10) Patent No.: US 7,994,938 B2
(45) Date of Patent: Aug. 9, 2011

(54) METHOD AND APPARATUS FOR DECIDING A TRAVELING DIRECTION IN A SPACE

(75) Inventor: Hung-Ren Lai, Hualian (TW)

(73) Assignee: Institute for Information Industry, Taipei (TW)

( * ) Notice: Subject to any disclaimer, the term of this patent is extended or adjusted under 35 U.S.C. 154(b) by 797 days.

(21) Appl. No.: 11/961,096

(22) Filed: Dec. 20, 2007

(65) Prior Publication Data

US 2009/0129300 A1 May 21, 2009

(30) Foreign Application Priority Data

Nov. 20, 2007 (TW) ................................ 096143854

(51) Int. Cl.
*B60Q 1/48* (2006.01)

(52) U.S. Cl. .................... 340/932.2; 340/988; 340/933; 340/8.1

(58) Field of Classification Search ............... 340/932.2, 340/988, 438, 933, 691.1, 691.6, 6.1, 8.1; 701/1, 207; 370/310
See application file for complete search history.

(56) References Cited

U.S. PATENT DOCUMENTS

| | | | | |
|---|---|---|---|---|
| 6,816,085 | B1 * | 11/2004 | Haynes et al. | 340/932.2 |
| 6,885,312 | B1 * | 4/2005 | Kirkpatrick | 340/932.2 |
| 7,253,747 | B2 * | 8/2007 | Noguchi | 340/932.2 |
| 2003/0112154 | A1 * | 6/2003 | Yoakum et al. | 340/932.2 |

* cited by examiner

*Primary Examiner* — Toan N Pham

(74) *Attorney, Agent, or Firm* — Patterson Thuente Christensen Pedersen P.A.

(57) ABSTRACT

A method and an apparatus for deciding a traveling direction in a space are provided. After receiving a starting signal from a mobile apparatus, a network node of a network apparatus generates a request signal and sends it to a processing apparatus. Then the processing apparatus decides the traveling direction and sends a direction signal comprising the traveling direction to the nearest network node to instruct a moving apparatus to move. The method, and apparatus are more convenient and more cost-effective system than those in the prior art.

22 Claims, 4 Drawing Sheets

METHOD AND APPARATUS FOR DECIDING A TRAVELING DIRECTION IN A SPACE

This application claims the benefits of priority based on Taiwan Patent Application No. 096143854, filed on Nov. 20, 2007, the disclosures of which are incorporated by reference herein.

CROSS-REFERENCES TO RELATED APPLICATIONS

Not applicable.

BACKGROUND OF THE INVENTION

1. Field of the Invention

The present invention relates to a method and an apparatus for deciding a traveling direction in a space; and more particularly, relates to a method and an apparatus for utilizing a plurality of network nodes to decide a traveling direction.

2. Descriptions of the Related Art

Nowadays, parking lots exist almost everywhere in metropolitan areas. These parking lots, no matter indoors or outdoors, are all evolving towards an automatic nature, and most of them have already charging fees in an automatic way. However, for large parking lots, guiding services are still required to help drivers to find an available parking space in a shortest time when entering a parking lot and to find their cars immediately when leaving there. This has become a main aspect to be researched for further improving parking services.

As the GPS technology is becoming increasingly sophisticated in recent years, some service providers in the art have attempted to adopt this technology in parking services. Unfortunately, application of GPS is only limited to outdoor parking lots where a good GPS signal can be received. Therefore, the parking guide services provided in this way are mostly limited to informing drivers where a parking lot is available, and fail to provide ideal and complete solutions of parking guide and car searching services for indoor parking lots.

Furthermore, parking guide services provided in conventional parking lots are mostly limited to informing drivers whether empty parking spaces exist in the parking lot, in a specific region and/or at a specific floor. Under such circumstances, drivers who have no means to know the precise position of an empty parking space; they have to spend time in searching the exact position of the available parking space, which is very inconvenient.

U.S. Pat. No. 6,107,942 discloses a parking guide management system. A method used by the system to detect an empty parking space is to install video cameras above parking spaces and acquire images the parking spaces periodically. Then, a comparison is made between associated images to determine if an individual parking space is empty. However, this method is disadvantageous in that it requires many video cameras, which tends to drive the cost considerably higher especially for large parking lots.

U.S. Pat. No. 6,650,250 discloses a parking guide system and a computer application thereof. This system indicates empty parking spaces to drivers by sensing the number of empty parking spaces and parking regions with empty parking spaces, and transmitting a graphic signal or a voice signal to the entrance. This method is disadvantageous in that drivers can only be informed of locations of empty parking spaces, but do not know traveling direction towards such parking spaces. Moreover, this method fails to provide a car searching service.

In summary, the prior art parking guide systems fail to provide precise information related to parking guide services, and are very expensive to implement. Furthermore, most of the prior art systems fail to provide a car searching service. In view of this, it is highly desirable in the art to provide a system for providing parking guide and car searching services with reduced cost and in a fast and convenient way.

SUMMARY OF THE INVENTION

One objective of this invention is to provide a method for deciding a traveling direction in a space. By deciding the traveling direction, this method can indicate a mobile apparatus to move to a specific position (i.e. an available position or a position it used previously), so that the mobile apparatus may move accordingly.

To achieve the objective, this method comprises the steps of: (a) receiving a starting signal from a mobile apparatus by a first network node in a plurality of network nodes; (b) generating a request signal in response to the starting signal by the first network node, the request signal including an identification code of the first network node; (c) transmitting the request signal to a processing apparatus by the first network node; and (d) receiving an indication signal from the processing apparatus by one of the network nodes, wherein the indication signal includes the traveling direction.

Another objective of this invention is to provide a method for deciding a traveling direction in a space. By deciding the traveling direction, this method can indicate a mobile apparatus to move to a specific position (i.e. an available position or a position it used previously), so that the mobile apparatus may move accordingly.

To achieve this, this method comprises the steps of: (a) receiving a request signal from a first network node in a plurality of network nodes, the request signal including an identification code of the first network node; (b) deciding the traveling direction according to the identification code of the first network node and a plurality of monitor messages, wherein each of the monitor messages corresponds to a position in the space, and each of the monitor messages indicates a usage status of the corresponding position; (c) generating an indication signal according to the identification code of the first network node and the traveling direction; and (d) transmitting the indication signal to one of the network nodes to indicate a mobile apparatus to move in accordance with the traveling direction.

Yet another objective of this invention is to provide a network apparatus for deciding a traveling direction in a space. This network apparatus can indicate a mobile apparatus to move to a specific position in accordance with the traveling direction. Consequently, the network apparatus provides more convenience in using the space.

To this end, this network apparatus comprises a plurality of network nodes, each of which corresponds to a position in the space. Each of the network nodes comprises a signal generator and a receiving/transmitting interface. The receiving/transmitting interface of a first network node of the network nodes is configured for receiving a starting signal from a mobile apparatus and transmitting a request signal to a processing apparatus in response to the starting signal, wherein the request signal comprises an identification code of the first network node. The receiving/transmitting interface of one of the network nodes is configured for receiving an indication signal from the processing apparatus, wherein the indication signal comprises the traveling direction. As a result, the mobile apparatus is capable of moving in accordance with the indication signal.

A further objective of this invention is to provide a processing apparatus for deciding a traveling direction in a space. This processing apparatus is configured to indicate a mobile apparatus to move to a specific position (i.e. an available position and/or a position it used previously), so that the mobile apparatus may move accordingly.

To this end, this processing apparatus comprises a storage apparatus, a receiving/transmitting interface, and a processing apparatus. The storage apparatus is configured for storing a plurality of monitor messages, each of which corresponds to a position in the space and indicates a usage status of the corresponding position. The receiving/transmitting interface is configured for receiving a request signal from a first network node in a plurality of network nodes, and transmitting an indication signal to one of the network nodes to indicate a mobile apparatus to move in accordance with the traveling direction, wherein the request signal comprises an identification code of the first network node and the indication signal comprises the traveling direction. The processor is configured for deciding the traveling direction according to the identification code of the first network node and the monitor messages, and generating the indication signal in accordance with the identification code of the first network node and the traveling direction.

Yet a further objective of this invention is to provide a system for deciding a traveling direction in a space. This system forms a wireless sensor network covering the space. To this end, this system comprises a mobile apparatus, the aforesaid network apparatus, and the aforesaid processing apparatus integrated therein to perform the aforesaid method.

In summary, this invention provides a system, an apparatus, and a method for deciding a traveling direction in a space. With this invention, it is possible to keep track of usage statuses of respective positions in the space, so that users can be informed how to use this space. For example, applications of parking guide and car searching services may adopt the present invention. However, this invention may also be applied in other spaces having similar requirements, but is not just limited to the parking application.

By using the apparatus and method of the present invention, the implementation cost of providing a traveling direction for a user can be reduced. Furthermore, as the wireless sensor network system are realized by network nodes having sensing capabilities, the aforementioned space is not limited to outdoor space, thus the present invention does not have the disadvantages of the GPS technology.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
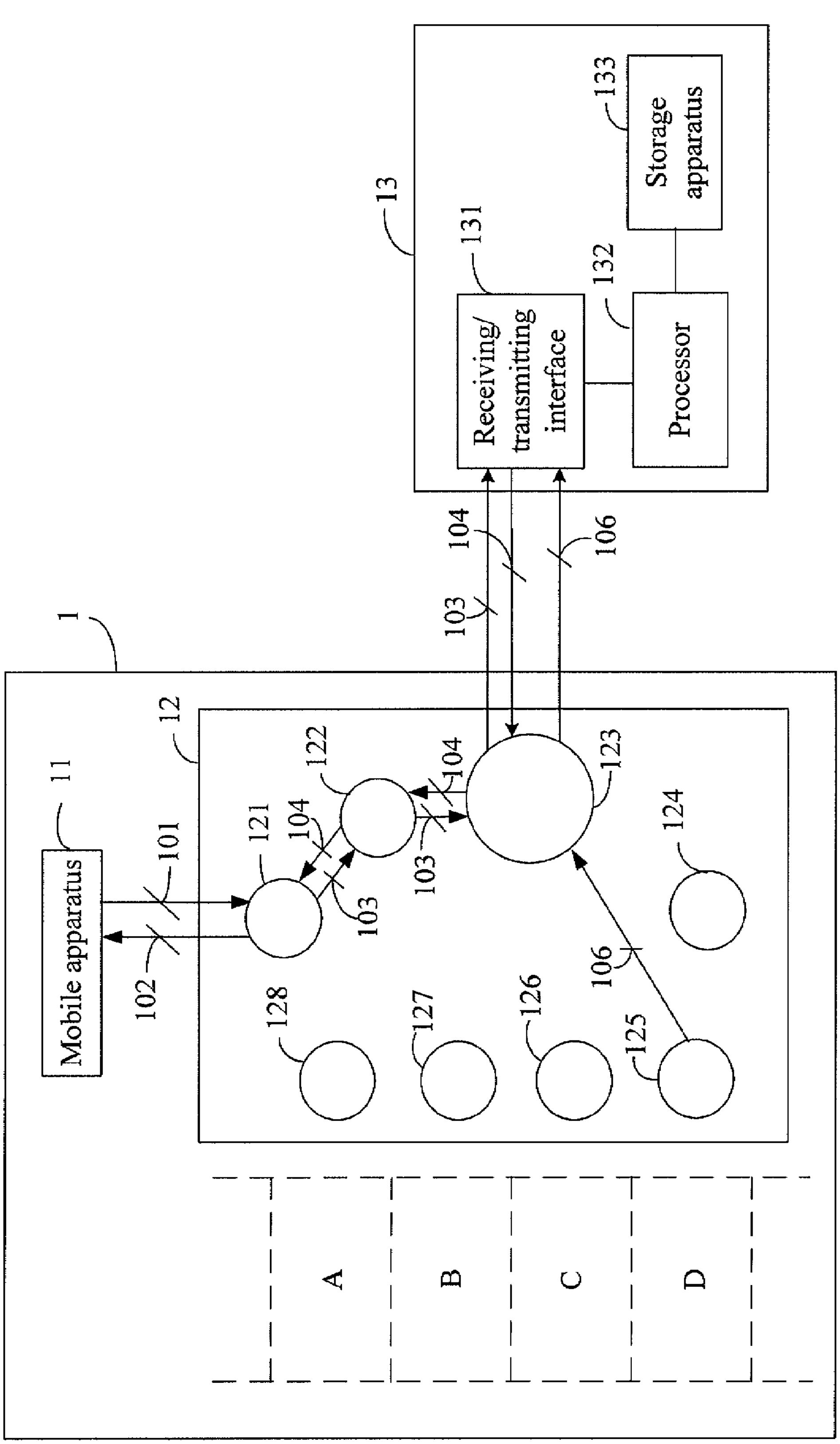
FIG. 1A depicts a first embodiment of this invention.

FIG. 1A depicts a first embodiment of this invention, which is a wireless sensor network system for deciding a travel direction in a space 1. The apparatuses comprised in the wireless sensor network system form a wireless sensor network. The signals generated by the wireless sensor network cover the space 1. In this embodiment, a parking lot will be taken as an example of the space 1 to describe operation of the wireless sensor network system.

The wireless sensor network system comprises a mobile apparatus 11, a network apparatus 12, and a processing apparatus 13, wherein the network apparatus 12 comprises a plurality of network nodes 121~128. All these apparatuses are provided with capability of transmitting and receiving wireless sensing signals. The mobile apparatus 11 of this embodiment may be a ticket card issued at an entrance gateway of the parking lot or a ticket card purchased in advance by the user. The mobile apparatus 11 is kept by the user in the space 1, and the wireless sensor network system indicates a traveling direction through operation of the network apparatus 12 and the processing apparatus 13 in order to instruct the user to move in accordance with the travel direction. For example, this may be used in a parking lot for a parking guide service (i.e., guiding a user to find an available parking space along the traveling direction) and/or a car searching service (i.e., guiding a user to find the position a car was parked in the space 1 along the traveling direction). Operations of the wireless sensor network system are described by using parking guide and car searching services as examples.

Figure 1B:
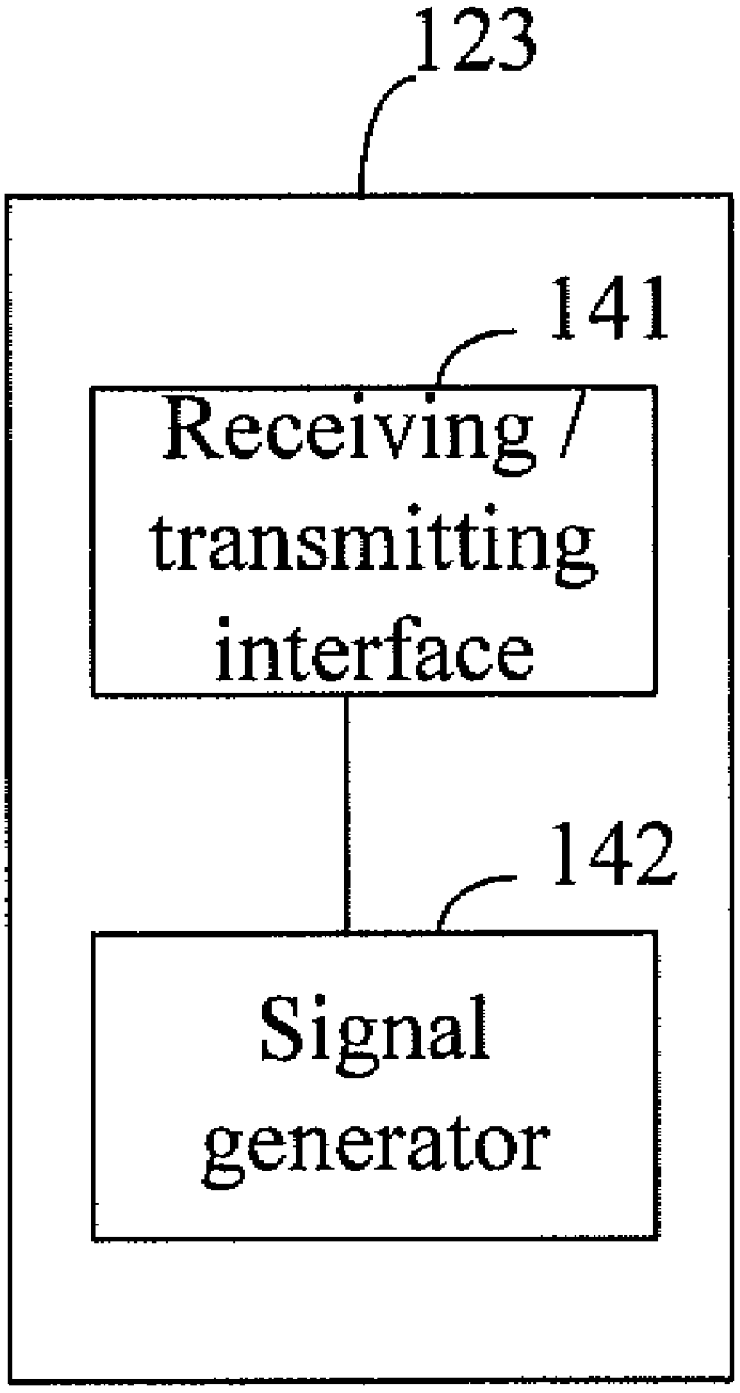
FIG. 1B depicts a schematic view of a structure of a network node in accordance with this invention.

In particular, the mobile apparatus 11 comprises a transmitter (not shown), a signal receiver (not shown), a parking button (not shown), and a car searching button (not shown). Each of the network nodes 121~128 comprised in the network apparatus 12 comprises a receiving/transmitting interface and a signal generator respectively. For example, the network node 123 shown in FIG. 1B comprises a receiving/transmitting interface 141 and a signal generator 142. Each of the network nodes 121~128 corresponds to a position in the space 1 (i.e., the parking lot), respectively. More specifically, the network nodes 128, 127, 126, 125 in this embodiment correspond to the positions (i.e., parking spaces) A, B, C, D, respectively, while other network nodes correspond to other positions (e.g., walkway in the parking lot) in this space 1. It should be noted that, in addition to the transmitting/receiving interface, each of the network nodes may further comprise a sensor (not shown) for sensing usage status of the corresponding position or an indicator (not shown) for indicating and/or broadcasting a traveling direction, which will be described in detail hereinafter. The processing apparatus 13 comprises a receiving/transmitting interface 131, a processor 132, and a storage apparatus 133.

First, operations of the wireless sensor network system to decide a traveling direction towards an available position (a parking space) in the space 1, i.e., a parking guide operation, are described. Please refer to both FIG. 1A and FIG. 1B. The transmitting/receiving interface of a first network node 121 in the network apparatus 12 transmits a trigger signal 102 continuously. Hence, when the mobile apparatus 11 approaches the entrance of the parking lot, the mobile apparatus 11 will be triggered by the trigger signal 102. Once being triggered, the mobile apparatus 11 transmits a starting signal 101, which will be received by the transmitting/receiving interface of the first network node 121 in response to. Generally, the first network node 121 is the entrance gateway of the parking lot. Alternatively, in other embodiments, the user may also press down a starting button (not shown) on the mobile apparatus 11 directly to send the starting signal 101.

After the network node 121 receives the starting signal 101, the signal generator thereof generates a request signal 103 in response to the starting signal 101, wherein the starting signal

101 comprises an identification code of the first network node 121 and a code of the mobile apparatus 11. The network node 121 then transmits the request signal 103 to the processing apparatus 13 via its receiving/transmitting interface. It should be noted that, if the distances between the network nodes 121~128 and the processing apparatus 13 is too far, signals transmitted from the network nodes 121~128 to the processing apparatus 13 will be relayed to the processing apparatus 13 instead of being transmitted directly. In this embodiment, the network node 121 transmits the request signal 103 via the network nodes 122, 123 successively to the processing apparatus 13.

Upon the receiving/transmitting interface 131 of the processing apparatus 13 receiving the request signal 103 from the network node 121, the processor 132 decides a traveling direction in response to the request signal 103. In more details, the processor 132 determines at first whether a searching request is included in the request signal 103, where the searching request represents a request by the mobile apparatus 11 for a parking guide service. Here, it is assumed that the request signal 103 includes a searching request. Then, the processor 132 reads a plurality of monitor messages from the storage apparatus 133. Each of the monitor messages corresponds to one of the positions (i.e., the aforesaid parking spaces A, B, C, D) in the space 1 and stores a usage status of the corresponding position, i.e., each of the monitor messages stores a current usage status of the corresponding position. Thus, it can be known which positions (parking spaces) are currently available. On the other hand, if a position is occupied, the corresponding monitor message will include a code of the mobile apparatus associated with the parked car, so as to facilitate a car searching service.

Subsequently, according to the identification code of the network node 121 included in the request signal 103, the processor 132 knows the position of the network node 121, i.e., speculates that the mobile apparatus 11 is now located near the network node 121. Then according to the monitor messages and the position of the network node 121, the processor 132 finds an available position that is nearest to the network node 121 (e.g., the position D), and decides a traveling direction according to this available position and the position of the network node 121.

Finally, the receiving/transmitting interface 131 of the processing apparatus 13 transmits an indication signal 104 comprising the traveling direction to one of the network nodes 121~128, and more specifically, to the network node that is equipped with an indicator and that is nearest to the mobile apparatus 11, which is the network node 121 in this embodiment. Similarly, transmissions between the network node 121 and the processing apparatus 13 are accomplished via other network nodes as well (i.e. via the network node 123 and the network node 122).

Upon the receiving/transmitting interface of the network node 121 receiving the indication signal 104, the indicator thereof indicates the mobile apparatus 11 to move in accordance with the traveling direction to assist the mobile apparatus 11 to reach the available parking space, i.e., to a specific one of the positions, for example, the position D. In this embodiment, the indicator of the network node 121 is a display device, which operates by displaying the traveling direction to the mobile apparatus 11. Indicators of other network nodes may be a broadcasting device, which operates by broadcasting the traveling direction. It should be noted that, the indicator used in this invention is not limited a display apparatus, a broadcasting apparatus, and/or a combination thereof, and any other apparatus capable of providing an indication may be used as an indicator of the network node.

It should be further noted that, network nodes corresponding to monitor messages stored in the storage apparatus 133 of the processing apparatus 13 are equipped with sensors. In this embodiment, the network nodes 125, 126, 127, 128 include a sensor respectively to monitor usage status of corresponding positions D, C, B, A, and transmit an update signal (not shown) to the processing apparatus 13 periodically. Similarly, if the distances between the network nodes 125, 126, 127, 128 and the processing apparatus 13 is too far so that signals cannot be transmitted directly, the update signal may be transmitted via other network nodes. The update signal includes an identification code of the network node and a usage status of the corresponding position, so that the processor 132 may update the corresponding monitor message stored in the storage apparatus 133 according to the update signal. As a result, the processor 13 can be informed if individual parking spaces are occupied by cars, thereby to decide a correct traveling direction.

In addition, upon receiving update signals from all network nodes and updating the monitor messages, the processor 132 periodically transmits the monitor messages to network nodes having an indicator, so as to provide messages related to available parking spaces.

Once the mobile apparatus 11 has followed the traveling direction to reach the specific position D, the receiving/transmitting interface of the corresponding network node 125 transmits an acknowledgement signal 106 to the processing apparatus 13, wherein the acknowledgement signal 106 includes a code of the mobile apparatus 11 and an identification code of the network node 125. The acknowledgement signal 106 informs the processing apparatus 13 that the mobile apparatus 11 has moved to the specific position D. According to the acknowledgement signal 106, the processor 132 of the processing apparatus 13 records the identification code of the network node 125 corresponding to the code of the mobile apparatus 11, i.e., records the parking position. Alternatively, the user may press down a parking button on the mobile apparatus 11, so that the network node 125 that is nearest to the mobile apparatus 11 transmits the acknowledgement signal 106 to the processing apparatus 13 to inform the parking position.

Next, operations of the system to decide a traveling direction towards a previously occupied position, i.e., a car searching operation, will be described. Please refer to both FIG. 1A and FIG. 1B together. First, a user in the space 1 (i.e., the parking lot) presses down a car searching button on the mobile apparatus 11 to transmit a starting signal 101. Then, the receiving/transmitting interface of the network node 121 nearest to the mobile apparatus 11 receives the starting signal 101, and the signal generator thereof generates a request signal 103 including an identification code of the network node 121 and a code of the mobile apparatus 11. The request signal 103 is then transmitted to the processing apparatus 13 via the receiving/transmitting interface. The way in which the transmission is accomplished is just as described above and will not be described in detail. It should be noted that, in this case, the network node nearest to the mobile apparatus 11 is not necessarily the same as the aforesaid network node described in the parking guide process. In other words, a user may enter the space 1 via other entrances and presses down the car searching button anywhere in the space 1.

Upon the receiving/transmitting interface 131 of the processing apparatus 13 receiving the request signal 103, the processor 132 decides a traveling direction according to the request signal 103. In more detail, the processor 132 determines whether a car searching request is included in the request signal 103, i.e., whether the request is a car searching request. Subsequently, according to a code of the mobile apparatus 11 included in the request signal 103, the processor 132 searches from the monitor messages the one including the code. A position corresponding to the network node 125 associated with the monitor message is the specific position, i.e., the position where the target car is parked.

At this point, the processor 132 can decide the traveling direction according to the identification code of the network node 125 corresponding to the code of the mobile apparatus 11 and the identification code of the network node 121, i.e., decide the traveling direction according to the original parking position and the current position of the mobile apparatus 11. Finally, an indication signal 104 including the traveling direction is transmitted by the receiving/transmitting interface 131 to a network node equipped with an indicator 123 and nearest to the mobile apparatus 11, which is the network node 121 in this embodiment. The way that the transmission is accomplished is just as described above and will not be described in detail again. Alternatively, in other embodiments, the network node 121 may be replaced by other network nodes, and this will not be described in detail herein.

Upon the receiving/transmitting interface of the network node 121 receiving the indication signal 104, the indicator thereof will indicate the indication signal 104 by displaying, broadcasting or a combination thereof, so as to indicate the mobile apparatus 11 to move in accordance with the traveling direction towards the original parking position. It should be noted that, the way described here is only for purpose of illustration, but is not just limited thereto.

With the configuration described above, the first embodiment provides a wireless sensor network system for deciding a traveling direction in a space. By use of the wireless sensor network system, it is possible to keep track of the usage statuses of individual positions, so that the user may be informed how to use this space, for example, as described for the parking guide and car searching services in this embodiment. Configuration of the first embodiment may also be applied to other spaces having similar requirements, but is not limited to parking lot applications. Furthermore, as the wireless sensor network system operates via network nodes having a sensing capability, the space using the present invention is not limited to outdoor spaces. Thus, the present invention can overcome the disadvantages of the GPS system.

Figure 2:
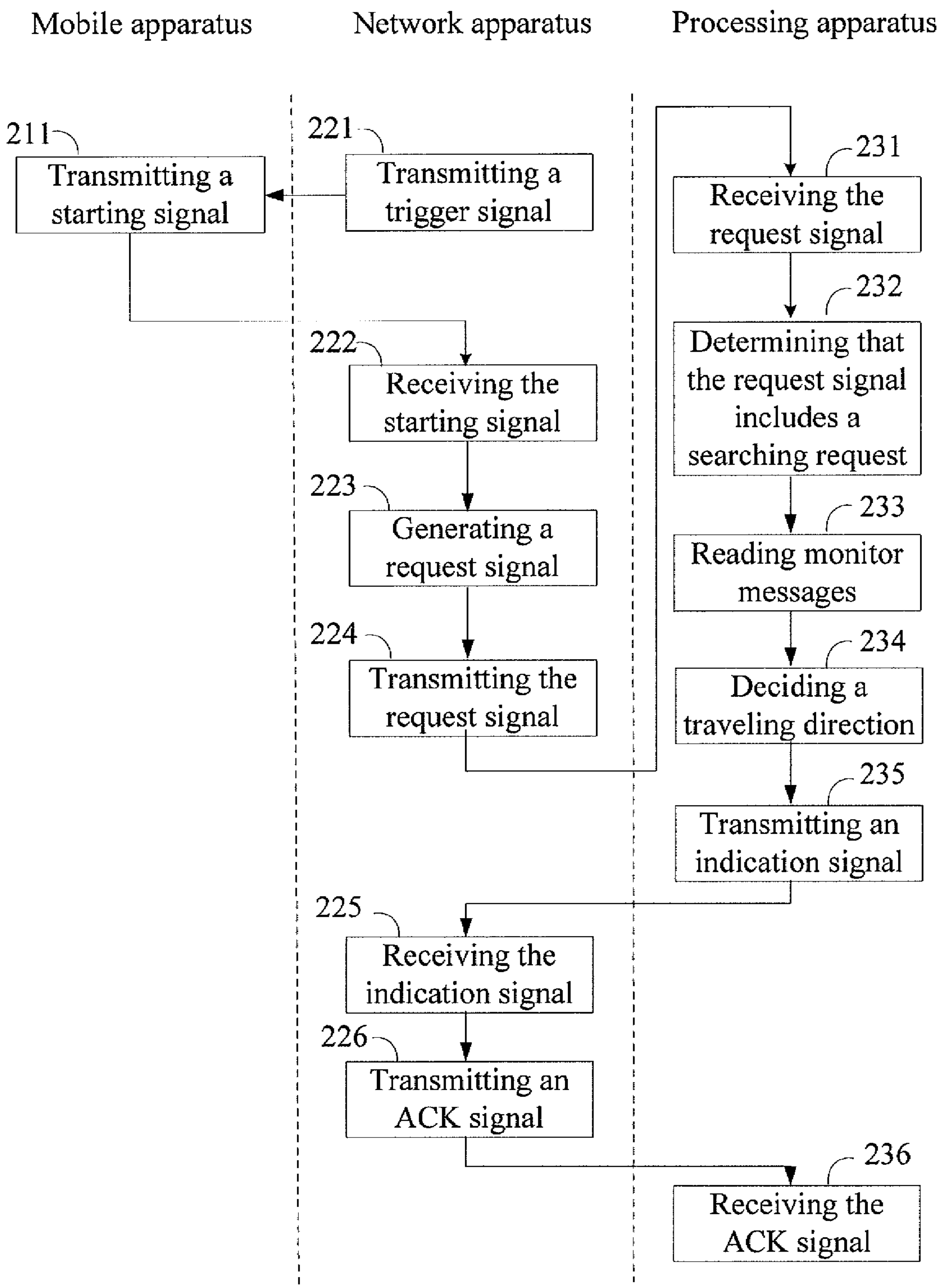
FIG. 2 depicts a flow chart of a method in accordance with a second embodiment of this invention.

A second embodiment of this invention is a method for deciding a traveling direction in a space, i.e., a method for deciding a traveling direction towards an available position. This method may be applied in the wireless sensor network system described in FIG. 1A and FIG. 1B, and is executed by a mobile apparatus 11, a network apparatus 12 comprising a plurality of network nodes, and a processing apparatus 13 respectively. A flow chart of the second embodiment is depicted in FIG. 2 in three columns, wherein the steps in the left column are executed by the mobile apparatus 11, the steps in the middle column are executed by the network apparatus 12, and the steps in the right column are executed by the processing apparatus 13.

Initially, the network node 121 nearest to the mobile apparatus 11 executes step 221 to transmit a trigger signal 102 to trigger the mobile apparatus 11. Then in step 211, the mobile apparatus 11 transmits a starting signal 101 in response to the trigger signal 102. Next in step 222, the network node 121 nearest to the mobile apparatus 11 receives the starting signal 101. In other embodiments, step 221 may be omitted, and the starting signal 101 is transmitted when a user presses down a starting button on the mobile apparatus 11.

Subsequently, the network node 121 generates a request signal 103 in step 223 and transmits the request signal 103 to the processing apparatus 13 in step 224. The ways to accomplish the transmission is just as described in the first embodiment, and will not be described in detail herein again.

In step 231, the processing apparatus 13 receives the request signal 103. Next in step 232, the processor 132 determines that a searching request is included in the request signal 103, wherein the searching request represents an intention to search for an available position in the space. Thereafter, the processing apparatus 13 reads a plurality of monitor messages in step 233, and finds a currently available position (i.e., a specific position) according to usage statuses recorded by the monitor messages and the identification code of the network node 121 included in the request signal 103. Finally in step 235, the processing apparatus 13 transmits an indication signal 104 including the traveling direction to a network node 121 equipped with an indicator and nearest to the mobile apparatus 11 in the network apparatus. The way to accomplish the transmission is just as described in the first embodiment, and will not be described in detail herein again.

After receiving the indication signal 104 in step 225, the network node 121 can indicate the mobile apparatus 11 to move in accordance with the traveling direction. Once the mobile apparatus 11 reaches the specific position, the network node 125 nearest to the mobile apparatus 11 executes step 226 to transmit an acknowledgement signal 106 to the processing apparatus 13. Thereafter, the receiving/transmitting interface 131 of the processing apparatus 13 receives the acknowledgement signal 106 in step 236 to record that the code of the mobile apparatus 11 corresponds to the identification code of the network node 125.

In addition to the steps in FIG. 2, the second embodiment is able to execute all of the functions and operations provided in the parking guide service of the first embodiment. Those skilled in this field should be able to straightforwardly realize how the second embodiment performs these operations and functions based on the above descriptions of the first embodiment. Thus, no unnecessary detail is given here.

Figure 3:
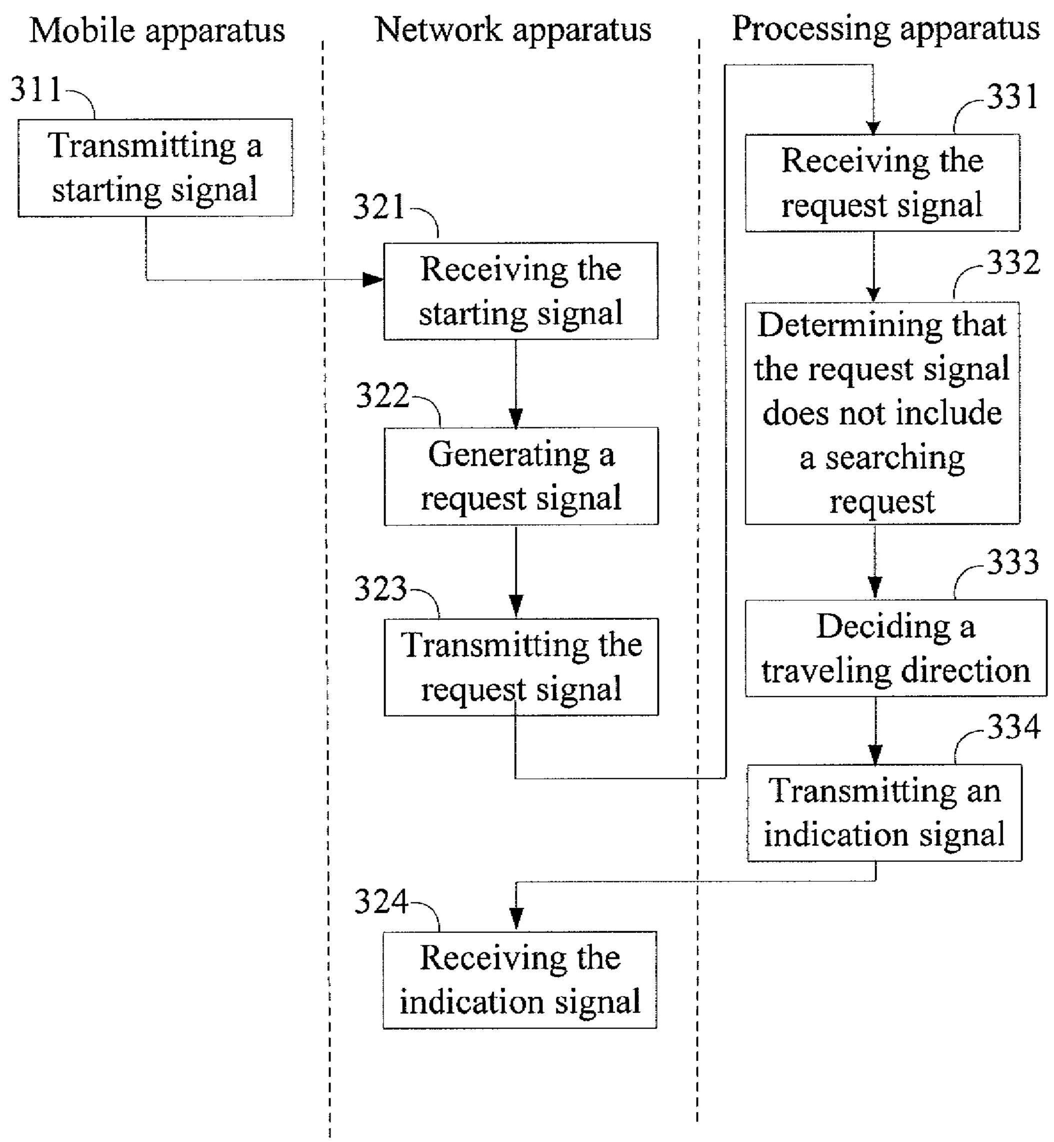
FIG. 3 depicts a flow chart of a method in accordance with a third embodiment of this invention.

A third embodiment of this invention is a method for deciding a traveling direction in a space, i.e., a method for deciding a traveling direction towards a previously used position. This method is applied in the wireless sensor network system described in FIG. 1A and FIG. 1B, and is executed by a mobile apparatus 11, a network apparatus 12 comprising a plurality of network nodes, and a processing apparatus 13, respectively. A flow chart of the third embodiment is depicted in FIG. 3 in three columns, wherein the steps in the left column are executed by the mobile apparatus 11, the steps in the middle column are executed by the network apparatus 12, and the steps in the right column are executed by the processing apparatus 13.

First, the mobile apparatus 11 in the parking lot transmits a starting signal 101 in step 311, and a network node 121 nearest to the mobile apparatus 11 receives the starting signal 101 in step 321. Then, the network node 121 generates a request signal 103 in response to the starting signal 101 in step 322 and transmits the starting signal 101 to the processing apparatus 13 in step 323.

Upon receiving the request signal 103 in step 331, the processing apparatus 13 determines that the request signal 103 does not comprise a searching request. The processing apparatus 13 then executes step 333 to decide the traveling direction towards the previously used position according to an identification code of the network nodes 125 corresponding to a code of the mobile apparatus 11 included in the request signal 103. Finally in step 334, the processing apparatus 13 transmits an indication signal 104 including the traveling direction to a network node 121 equipped with an indicator and nearest to the mobile apparatus 11.

After receiving the indication signal 104 from the processing apparatus 13 in step 324, the network node 121 can indicate the mobile apparatus 11 to move in accordance with the traveling direction towards the originally used position.

In addition to the above steps, the third embodiment is able to execute all the functions and operations provided in the car searching service of the first embodiment. Those skilled in this field should be able to straightforwardly realize how the third embodiment performs these operations and functions based on the above descriptions of the first embodiment. Thus, no unnecessary detail is given here.

In summary, this invention provides a wireless sensor network system, an apparatus, and a method for deciding a traveling direction in a space. With this invention, it is possible to keep track of usage statuses of respective positions in the space, so that users can be informed how to use this space. For example, this invention may be applied in parking guide and car searching services. This invention may also be applied in other spaces having similar needs. Furthermore, as the wireless sensor network system operates via network nodes having a sensing capability, the use thereof is not just limited to outdoor spaces, thus the present invention overcomes the disadvantages of the GPS technology.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for deciding a traveling direction in a space, comprising the steps of:

(a) receiving a starting signal from a mobile apparatus by a first network node in a plurality of network nodes, wherein each of the network nodes respectively corresponds to a position in the space;

(b) generating a request signal in response to the starting signal by the first network node, the request signal including an identification code of the first network node;

(c) transmitting the request signal to a processing apparatus by the first network node; and (d) receiving an indication signal from the processing apparatus by one of the network nodes, wherein the indication signal includes the traveling direction so that the mobile apparatus is able to move in accordance with the traveling direction.

2. The method of claim 1, further comprising the step of:

(e) indicating the mobile apparatus to move to a specific position of the positions in accordance with the traveling direction.

3. The method of claim 2, wherein the step (e) indicates the traveling direction by one of a displaying method, a broadcasting method, and the combination thereof.

4. The method of claim 2, further comprising the step of:

transmitting an acknowledgement signal by the network node corresponding to the specific position to inform the processing apparatus that the mobile apparatus has moved to the specific position.

5. The method of claim 1, further comprising the steps of:

transmitting a trigger signal by the first network node, wherein the step (a) is executed in response to the trigger signal.

6. A method for deciding a traveling direction in a space, comprising the steps of:

(a) receiving a request signal from a first network node in a plurality of network nodes, the request signal including an identification code of the first network node;

(b) deciding the traveling direction according to the identification code of the first network node and a plurality of monitor messages, wherein each of the monitor messages corresponds to a position in the space, and each of the monitor messages indicates a usage status of the corresponding position;

(c) generating an indication signal according to the identification code of the first network node and the traveling direction; and (d) transmitting the indication signal to one of the network nodes to indicate a mobile apparatus to move in accordance with the traveling direction.

7. The method of claim 6, wherein the request signal further comprises a code of the mobile apparatus, and the method further comprises the step of:

recording that an identification code of the network node that is closet to the mobile apparatus corresponds to the code.

8. The method of claim 6, wherein the step (b) comprises the steps of:

determining that the request signal comprises a searching request;

reading the monitor messages in response to the searching request; and deciding the traveling direction according to the usage status and the identification code of the first network node.

9. The method of claim 6, wherein the request signal further comprises a code of the mobile apparatus, each of the monitor messages corresponding to a mobile apparatus code, and the step (b) comprises the steps of:

determining that the request signal does not comprise a searching request;

deciding the position that corresponds to the monitor message having the code to be a specific position; and deciding the traveling direction according to the specific position and the identification code of the first network node.

10. The method of claim 6, wherein each of the network nodes respectively corresponds to one of the positions, and the method further comprises the steps of:

receiving a plurality of update signals, each of the update signals comprises an identification code of one of the network nodes and a usage status of the corresponding position; and updating the corresponding monitor messages according to each of the update signals.

11. The method of claim 10, further comprising the step of:

transmitting the monitor messages to the network nodes with an indication function.

12. A network apparatus for deciding a traveling direction in a space, comprising:

a plurality of network nodes, each of the network nodes corresponding to a position in the space, and each of the network nodes comprising:

a signal generator; and a receiving/transmitting interface;

wherein the receiving/transmitting interface of a first network node of the network nodes is configured for receiving a starting signal from a mobile apparatus, the receiving/transmitting interface of the first network node is configured for transmitting a request signal to a processing apparatus in response to the starting signal, the request signal comprises an identification code of the first network node, and the receiving/transmitting interface of one of the network nodes is configured for receiving an indication signal from the processing apparatus, wherein the indication signal comprises the traveling direction.

13. The network apparatus of claim 12, wherein the network node that receives the indication signal further comprises:

an indicator for indicating the mobile apparatus to move to a specific position of the positions in accordance with the traveling direction.

14. The network apparatus of claim 13, wherein the indicator is one of a display apparatus, a broadcast apparatus, and the combination thereof.

15. The network apparatus of claim 13, wherein the receiving/transmitting interface of the network node corresponding to the specific position is further configured for transmitting an acknowledgement signal to inform the processing apparatus that the mobile apparatus has moved to the specific position.

16. The network apparatus of claim 12, wherein the receiving/transmitting interface of the first network node is further configured for transmitting a trigger signal, so that the receiving/transmitting interface of the first network node receives the starting signal from the mobile apparatus in response to the trigger signal.

17. A processing apparatus for deciding a traveling direction in a space, comprising:

a storage apparatus, being configured for storing a plurality of monitor messages, each of the monitor messages corresponding to a position in the space, each of the monitor message indicating a usage status of a corresponding position;

a receiving/transmitting interface, being configured for receiving a request signal from a first network node in a plurality of network nodes, the request signal comprising an identification code of the first network node, being configured for transmitting an indication signal to one of the network nodes to indicate a mobile apparatus to move in accordance with the traveling direction, and the indication signal comprising the traveling direction; and a processor, being configured for deciding the traveling direction according to the identification code of the first network node and the monitor messages, and being configured for generating the indication signal in accordance with the identification code of the first network node and the traveling direction.

18. The processing apparatus of claim 17, wherein the request signal further comprises a code of the mobile apparatus, and the processor is further configured for recording an identification code of the network node that is closest to the mobile apparatus corresponding to the code.

19. The processing apparatus of claim 17, wherein the processor is further configured for determining that the request signal comprises a searching request, for reading a plurality of monitor messages in response to the searching request, and for deciding the traveling direction according to the usage status and the identification code of the first network node.

20. The processing apparatus of claim 17, wherein the request signal further comprises a code of the mobile apparatus, the processor further determines that the request signal does not comprise a searching request, decides the position that corresponds to the monitor message having the code to be a specific position, and decides the traveling direction according to the specific position and the identification code of the first network node.

21. The processing apparatus of claim 17, wherein each of the network nodes respectively corresponds to one of the positions, the receiving/transmitting interface is further configured for receiving a plurality of update signals, each of the update signals comprises an identification code of one of the network nodes and a usage status of the corresponding position, and the processor is further configured for updating the corresponding monitor message according to each of the update signals.

22. The processing apparatus of claim 21, wherein the receiving/transmitting interface is further configured for transmitting the monitor messages to the network nodes with an indication function.

* * * * *